US010604128B2

(12) United States Patent
Strehle et al.

(10) Patent No.: US 10,604,128 B2
(45) Date of Patent: Mar. 31, 2020

(54) ELECTRONICALLY SLIP-CONTROLLABLE BRAKING SYSTEM

(71) Applicant: Robert Bosch GmbH, Stuttgart (DE)

(72) Inventors: Alfred Strehle, Fellbach (DE); Marko Flinner, Boxberg-Bobstadt (DE); Matthias Schanzenbach, Eberstadt (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/793,168

(22) Filed: Oct. 25, 2017

(65) Prior Publication Data

US 2018/0118180 A1 May 3, 2018

(30) Foreign Application Priority Data

Nov. 2, 2016 (DE) .................. 10 2016 221 444

(51) Int. Cl.
*B60T 8/48* (2006.01)
*B60T 8/26* (2006.01)
(Continued)

(52) U.S. Cl.
CPC .............. *B60T 8/489* (2013.01); *B60T 8/266* (2013.01); *B60T 8/268* (2013.01); *B60T 13/146* (2013.01); *B60T 13/662* (2013.01); *B60T 13/686* (2013.01)

(58) Field of Classification Search
CPC . B60T 7/042; B60T 7/043; B60T 7/12; B60T 8/32; B60T 8/1766; B60T 8/344;
(Continued)

(56) References Cited

U.S. PATENT DOCUMENTS

2011/0248558 A1* 10/2011 Vollert ...................... B60T 1/10
303/3
2013/0127237 A1* 5/2013 Pfeiffer .................. B60T 8/4018
303/6.01
(Continued)

FOREIGN PATENT DOCUMENTS

DE 102009001135 A1 8/2010

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

An electronically slip-controllable vehicle braking system for a motor vehicle, including an actuatable brake master cylinder, to which at least one wheel brake that is associated with one wheel of a front axle of the vehicle, and at least one wheel brake that is associated with one wheel of a rear axle of the motor vehicle, are detachably connected. An electronically controllable first actuator suite of the braking system establishes and regulates mutually differing brake pressures in the wheel brakes as a function of the respectively existing slip conditions. An electronically controllable second actuator suite establishes and regulates a uniform brake pressure at the wheel brakes, and a third actuator suite limits the brake pressure generated by the second actuator suite at the at least one wheel brake associated with the wheel of the rear axle. Electronic control application to the actuator suites is accomplished via an electronic control device.

4 Claims, 1 Drawing Sheet

(51) Int. Cl.
*B60T 13/14* (2006.01)
*B60T 13/66* (2006.01)
*B60T 13/68* (2006.01)

(58) Field of Classification Search
CPC .... B60T 8/1755; B60T 8/4077; B60T 8/4872; B60T 8/34; B60T 8/348; B60T 8/268; B60T 8/266; B60T 8/489; B60T 13/66; B60T 13/68; B60T 13/686; B60T 13/662; B60T 13/146; B60T 13/745; B60T 2270/402; B60T 2270/403
USPC ...................................................... 303/113.2
See application file for complete search history.

(56) References Cited

U.S. PATENT DOCUMENTS

2014/0327297 A1\* 11/2014 Kaestner .................. B60T 1/10
303/116.1
2017/0210369 A1\* 7/2017 Lim ........................ B60T 7/042

\* cited by examiner

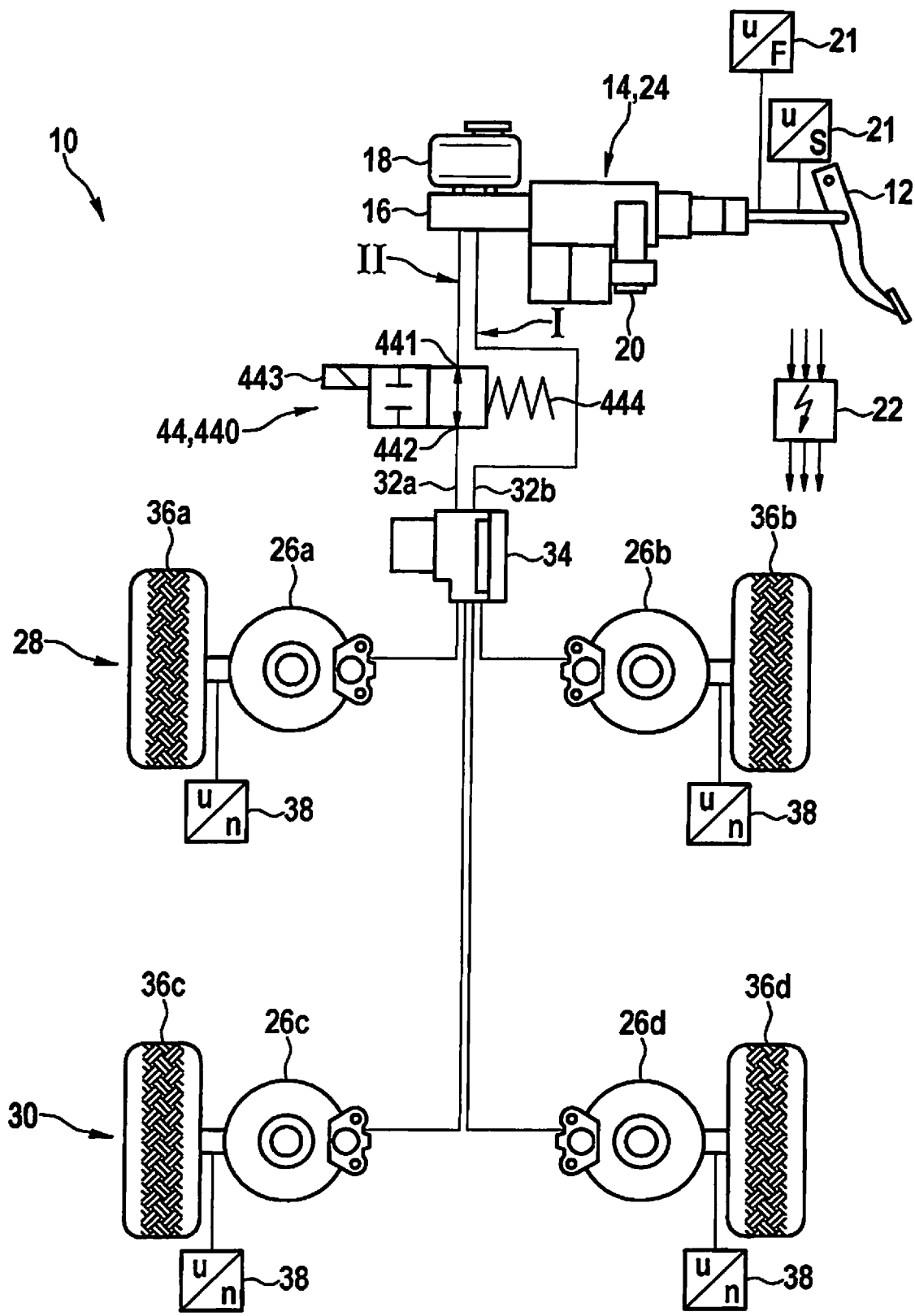

ELECTRONICALLY SLIP-CONTROLLABLE BRAKING SYSTEM

CROSS REFERENCE

The present application claims the benefit under 35 U.S.C. § 119 of German Patent Application No. DE 102016221444.6 filed on Nov. 2, 2016, which is expressly incorporated herein by reference in its entirety.

FIELD

The present invention relates to an electronically slip-controllable braking system.

BACKGROUND INFORMATION

An electronically slip-controllable braking system is described in German Patent Application No. DE 10 2009 001135 A1.

This braking system encompasses an electronically controllable first actuator suite, referred to below as a "primary" actuator suite, in the form of a conventional ABS/ESP brake system for individual-wheel modulation of brake pressure as a function of the slip conditions existing at the wheels. The brake pressures of the individual wheel brakes can be adjusted or regulated independently of one another. In conjunction with a conventional four-wheeled motor vehicle, this is therefore referred to as a "four-channel regulating actuator suite." The brake system encompasses, inter alia, a hydraulic assemblage made up of a housing block fitted with pumps and valves, and an electronic control device that actuates those pumps and valves as a function of sensor signals that represent the slip conditions at the individual wheels. Each wheel brake of the vehicle braking system has associated with it a respective brake pressure buildup valve and a respective brake pressure lowering valve for brake pressure regulation.

This primary actuator suite allows the driving state of a vehicle to be stabilized during a braking operation, upon initial movement, or during driving operation, by reducing the brake pressure at wheel brakes of wheels affected by slip. This reduced brake pressure can be generated jointly with the driver or independently of the driver. The primary actuator suite accordingly works in a so-called partly active or fully active mode.

This conventional vehicle braking system furthermore has a second actuator suite or secondary actuator suite in the form of an electromechanical brake booster. This secondary actuator suite is typically connected to the brake master cylinder and serves to enhance driving convenience during normal operation by assisting the driver in building up a brake pressure required for a braking operation. An electromechanical brake booster encompasses for this purpose an electronically controllable actuator that furnishes an external force for actuation of a brake master cylinder. Actuation of the brake master cylinder can be accomplished solely by the external force of the secondary actuator suite, or by a combination of that external force with a muscle force furnished by the driver.

The first and second actuator suite, or primary and secondary actuator suite, consequently constitute two mutually redundant systems for generating and modulating a brake pressure in a vehicle braking system, that brake pressure modulation being capable of being carried out respectively with or without the driver's participation. The two actuator suites thus meet an essential basic prerequisite for implementing and carrying out a partly or fully automated driving mode. Because the driver merely performs a monitoring function during such an automated driving mode, particularly stringent requirements exist in terms of the fail-safe performance of such electronically pressure-controllable vehicle braking systems, those requirements being met by the availability of the two actuator suites explained above.

In contrast to the primary actuator suite, however, by actuation of the brake master cylinder the secondary actuator suite is able to supply only a uniform brake pressure to all the wheel brakes of the vehicle braking system connected to that cylinder, or only to modulate that brake pressure uniformly. This functionality is referred to in technical language as a "single-channel" control actuator suite. A secondary actuator suite designed with a single channel is nevertheless sufficient to decelerate a vehicle to a complete stop, while maintaining its directional stability, in the event of a malfunction of the primary actuator suite.

Minimum requirements for longitudinal or directional stabilization of the vehicle are adherence to a locking sequence, i.e., a brake pressure buildup, in such a way that the wheel brakes of the front axle lock before the wheel brakes of the rear axle; furthermore maintaining steerability of the vehicle and consequently ensuring a maximum locking time for the vehicle wheels and a capability for active or driver-independent buildup of a brake pressure.

The result in particular of the aforementioned criterion of limiting the locking time of the wheels is that the maximum achievable deceleration values for the vehicle depend on the braking performance that can be converted by the wheel brakes of the rear axle. This convertible rear axle braking performance is comparatively low as a result of the dynamic axle load shift toward the front axle that takes place, due to inertia, in the course of a braking operation. Because an increase in axle load at the front axle is necessarily accompanied by a reduction in the axle load at the rear axle, the latter's wheels tend to lock considerably earlier, or at lower brake pressures, than the front wheels which are comparatively more heavily loaded.

Given the property of the secondary actuator suite, as explained, of being able to act upon all the existing wheel brakes only with a uniform brake pressure, in combination with a low brake pressure that can be converted by the wheel brakes of the rear axle without a risk of locking the associated wheels, the result in the case of a braking operation in which brake pressure is applied by the secondary actuator suite, because a malfunction has occurred in the primary actuator suite, is the disadvantage that the total braking performance that can be implemented by the vehicle is relatively low, consequently resulting in a relatively long braking distance for the vehicle. This has a particularly negative effect in vehicles in which the dynamic axle load shift toward the front axle in the context of a braking operation is particularly large.

To avoid this disadvantage, it is furthermore conventional to equip electronically pressure-controllable vehicle braking systems of the species with a further actuator suite, referred to below as a "third actuator suite," at the wheel brakes of the rear axle.

This third actuator suite is a further electronically controllable unit that is activated in the event of a fault in the primary actuator suite and adapts the brake pressure, furnished by the secondary actuator suite at the wheel brakes of the rear axle, to the reduced weight load at the rear axle which occurs in the context of that braking operation. It is thereby possible, by corresponding control application to the actuator of the secondary actuator suite, for the latter to furnish a brake pressure that can be entirely converted into braking performance only by the wheel brakes of the front axle, which is more heavily loaded in the context of a braking operation, by the fact that the third actuator suite interrupts a further rise in the brake pressure at the wheel brakes of the rear axle as soon as that brake pressure approaches a threshold value at which that brake pressure can still be entirely converted into braking performance. In other words, thanks to the third actuator suite the brake pressure level of the vehicle braking system is no longer limited, as explained above, to the lower brake pressure level convertible by the wheel brakes of the rear axle, and it furthermore becomes possible to utilize in its entirety the braking performance that can be transferred by the wheel brakes of the front axle. The overall result is that in this fashion, a higher total braking performance for the vehicle braking system, and consequently a considerably shorter braking operation and braking distance, can be achieved.

SUMMARY

An electronically pressure-controllable vehicle braking system in accordance with the present invention may be equipped, in addition to the primary and secondary actuator suite, with a third actuator suite that, according to the present invention, is of simple configuration, physically compact, easy to integrate into an existing brake circuit, and can be implemented in correspondingly inexpensive fashion.

According to the present invention, the third actuator suite is connected in series, in terms of flow engineering, with the second actuator suite or secondary actuator suite disposed upstream from the third actuator suite, and with the first actuator suite or primary actuator suite disposed downstream from the third actuator suite, of the braking system. This placement of the third actuator suite is advantageous because as a result, the actuator suites can be disposed in physical proximity to one another in the vehicle, short line connections are sufficient for electrical and hydraulic connection of the actuator suites, and an additional installation outlay or installation space requirement in the vehicle can be minimized.

Further advantages or advantageous refinements of the present invention are described herein.

According an example embodiment of the present invention, both the primary actuator suite and the secondary actuator suite are designed in dual-circuit fashion, or supply brake pressure to two mutually separated brake circuits. The two brake circuits are divided in parallel fashion, by the fact that one of the brake circuits encompasses the wheel brake of the front axle, and the respective other brake circuit the wheel brake of the rear axle. Two brake lines associated with the respective brake circuits connect the primary actuator suite and the second actuator suite to one another. The third actuator suite controls exactly one of the two brake lines, namely the one that is associated with the brake circuit having the wheel brake of the rear axle, while the respective other brake line connects the primary actuator suite and secondary actuator suite directly to one another. The expanded functionality of the braking system resulting from the third actuator suite is achieved, in accordance with an example embodiment of the present invention, by a single electronically controllable normally open distributing valve having two valve connectors, which is switchable into two valve positions. Normally open 2/2-way switching valves of this kind are also used, for example, for brake pressure regulation in the first actuator suite of the braking system, and are therefore available inexpensively on the market in sufficient quantity.

The third actuator suite can furthermore be embodied on a hydraulic assemblage of the primary actuator suite or on a housing of the secondary actuator suite, or can have a separate actuator housing. The electronic control device of the primary actuator suite and/or of the secondary actuator suite can likewise be grouped together with the one for the third actuator suite, or control devices that are respectively separate from and networked with one another can be used. The present invention thus makes possible a high level of design freedom in terms of its implementation.

BRIEF DESCRIPTION OF THE DRAWING

An exemplifying embodiment of the present invention is shown in the figures and is described in detail below.

The FIGURE show, in schematically simplified fashion, an electronically controllable braking system equipped with a first, a second, and a third actuator suite. The disposition according to the present invention of the third actuator suite within the braking system, and specific design embodiment details of that third actuator suite, are evident from the FIGURE.

DETAILED DESCRIPTION OF EXAMPLE EMBODIMENTS

The electronically slip-controllable braking system 10 as shown in the single FIGURE encompasses, inter alia, an actuation unit 14 actuatable via a brake pedal 12 by a driver via muscle force, and a brake master cylinder 16, acted upon by that actuation unit 14, which is supplied with hydraulic pressure medium via an attached reservoir 18. Actuation unit 14 is equipped with an electronically controllable actuator 20 with which, for example, the braking force applied by the driver can be boosted by an external force. This actuator 20 is, for example, an electronically controllable electric motor having a downstream linkage. Control is applied to the electric motor as a function of the actuation of brake pedal 12. Provided for this purpose on brake pedal 12 are sensors 21 which detect the actuation force and/or actuation travel, and thus a braking input, of a driver, and whose sensor signals are evaluated by an electronic control device 22 in order to calculate the control application signals for the electric motor. The electronically controllable brake booster, or actuation unit 14, constitutes a so-called second actuator suite 24 or secondary actuator suite within the braking system. That actuator suite acts on a conventionally embodied dual-circuit brake master cylinder 16, and is thereby capable of applying a uniform brake pressure to all wheel brakes 26 of vehicle braking system 10.

For that purpose, brake master cylinder 16, actuated by this second actuator suite 24, supplies pressure medium to two brake circuits I, II that are separated from one another. A division of brake circuits I, II is such that wheel brakes 26a, 26b of a front axle 28 of the vehicle are associated with the one brake circuit I, while wheel brakes 26c, 26d at rear axle 30 of the vehicle are associated with the respective other, second brake circuit II. A so-called parallel division of brake circuits I, II therefore exists; this is also referred to in technical language as a dual brake circuit division.

A pressure medium connector is present on brake master cylinder 16 for each of brake circuits I, II; connected to each pressure medium connector is a brake line 32a, 32b that is ultimately contacted to a respectively associated pressure medium connector on a first actuator suite 34 or primary actuator suite.

This actuator suite 34 is the hydraulic assemblage of a slip-controllable braking system sufficiently known from the existing art, also known as an ABS/ESP braking system. Unlike secondary actuator suite 24, first actuator suite 34 is capable of supplying different brake pressures individually to the various wheel brakes 26*a* to 26*d* of braking system 10. This primary actuator suite 24 possesses for that purpose, inter alia, a pressure generator unit that is not visible in the FIGURE and is drivable by a controllable electric motor; and one electronically controllable pressure buildup valve and one likewise controllable pressure reduction valve for each wheel brake 26*a* to 26*d*. Modulation of the brake pressure is accomplished as a function of the slip conditions that exist at the relevant wheel 36*a* to 36*d* and are detected by way of rotation speed sensors 38. The signals of these rotation speed sensors 38 are also delivered to electronic control device 22 and are further processed to yield control application signals for the electric motor and for the valves of first actuator suite 34.

Braking system 10 is furthermore equipped with a third actuator suite 44. The latter controls exactly one of the two brake lines I, II between second actuator suite 24 and first actuator suite 34 of braking system 10, specifically the brake line 32*a* which is associated with that brake circuit II which has wheel brakes 26*c*, 26*d* of rear axle 30. Third actuator suite 44 is disposed in terms of flow engineering downstream from second actuator suite 24 and upstream from first actuator suite 34, so that in terms of flow engineering, second actuator suite 24 forms one series circuit with third actuator suite 44 and first actuator suite 34. The respective other, second brake line I bypasses third actuator suite 44 and connects second actuator suite 24 directly to first actuator suite 34.

Third actuator suite 44 encompasses exactly one electronically controllable distributing valve 440 having two valve connectors 441, 442, which is switchable, by electronic control application to a preferably electromagnetically embodied valve actuation system 443, from a normally open idle position, against the force of a valve return means 444, into a blocking position. Intermediate positions of distributing valve 440 are not provided for in the exemplifying embodiment, but are conceivable in principle if distributing valve 440 were embodied not as a switching valve but as a proportional valve.

In the idle position as shown, there exists between valve connectors 441 and 442 a pressure medium connection that is interrupted when electronic control is applied to distributing valve 440 and it assumes its blocking position.

During normal operation of vehicle braking system 10, the necessary brake pressure is furnished by appropriate electronic control application to second actuator suite 24 or the secondary actuator suite as a function of an actuation of brake pedal 12, and optionally adapted as necessary, in accordance with the slip conditions existing at wheels 36*a* to 36*d*, by electronic control application to first actuator suite 34 or the primary actuator suite. The brake pressure buildup or brake pressure modulation can be performed with or without driver participation, for example if the driving state of the vehicle or traffic conditions require it, or if the vehicle is being operated in an autonomous driving mode.

Despite all technical precautions, disruptions to proper operation of braking system 10 unfortunately cannot be excluded.

In the case of a fault occurring in first actuator system 34, control is applied to second actuator system 24, which thereupon builds up brake pressure and decelerates the vehicle in stable fashion to a complete stop. First actuator suite 34 and second actuator suite 24 are embodied mutually redundantly, second actuator suite 24 being provided in order to safeguard against a fault in first actuator suite 34.

As explained previously, in the event of a fault in first actuator suite 34, a decrease in the brake pressure level furnished by second actuator suite 24 to wheel brakes 26*c*, 26*d* of rear axle 30 may be necessary in order to prevent those wheel brakes 26*c*, 26*d* from prematurely locking as a result of the axle load shift occurring in the context of the braking operation, combined with the uniform pressure application to all wheel brakes 26*a* to 26*d* by the brake pressure furnished by second actuator suite 24.

This is achieved by activation of and electronic control application to third actuator suite 44. Control is applied by electronic control device 22 in such a way that brake line II, associated with braking circuit II of wheel brakes 26*c*, 26*d* of rear axle 30, is blocked off as soon as the brake pressure in that brake circuit II approaches a threshold value that can no longer be converted by wheel brakes 26*c*, 26*d* of rear axle 30 into braking performance, i.e., as soon as an ongoing risk of locking of wheel brakes 26*c*, 26*d* of rear axle 30 is imminent. This threshold value is stored in electronic control device 22; it depends, inter alia, on the degree of axle load shifting, on the current vehicle deceleration, and on the slip conditions existing at wheels 36*c*, 36*d* of the vehicle. What is achieved by this type of adapted blocking of brake line 32*a*, associated with brake circuit II of rear axle 30, from second actuator suite 24 to first actuator suite 34 is that what now exists in that brake circuit II is only the brake pressure level that can in fact effectively be converted by wheel brakes 26*c*, 26*d* of rear axle 30 into braking performance, while at the same time the other braking circuit I, having wheel brakes 26*a*, 26*b* of front axle 28, can be acted upon by a brake pressure level that is higher as compared therewith. Third actuator suite 44 thus regulates, as required, a pressure difference between the brake pressures in the two brake circuits I, II. It assists second actuator suite 24 by preventing instabilities at rear axle 30 of the vehicle which arise in the event of a fault in primary actuator suite 34, without thereby decreasing the braking performance that can be transferred by wheel brakes 26*a*, 26*b* of front axle 28. The result is that by way of third actuator suite 44, the driving stability of a vehicle in the context of a braking operation controlled by secondary actuator suite 24 is improved, and maximum use is made of the available braking performance of the braking system. Thanks to third actuator suite 44, a vehicle can be decelerated in directionally stable fashion with the shortest possible braking distance even in the event of a fault in first actuator suite 34.

Third actuator suite 44 that is provided is inactive when vehicle braking system 10 is in normal, malfunction-free operation. Only if a malfunction of first actuator suite 34 has been identified by electronic control device 22, and if brake pressure is being furnished by second actuator suite 24, is third actuator suite 44 also activated. Even then, however, electronic control is applied to that third actuator suite 44 only when the brake pressure furnished by second actuator suite 24 can no longer be converted entirely into braking performance, due to axle load shifting from wheel brakes 26*c*, 26*d* on rear axle 30 and because of the existing slip conditions, i.e. when the associated wheels 36*c*, 36*d* of rear axle 30 would otherwise lock in uncontrolled fashion. Third actuator suite 44 will therefore experience only comparatively short operating times over its service life, and consequently will not be subject to any appreciable wear.

Modifications of or additions to the exemplifying embodiment described are of course conceivable without deviating from the basic idea of the invention.

What is claimed is:

1. An electronically slip-controllable braking system for a motor vehicle, comprising:
    an actuatable brake master cylinder to which at least one wheel brake that is associated with one wheel of a front axle of the vehicle and at least one wheel brake that is associated with one wheel of a rear axle of the motor vehicle are connected;
    an electronically controllable first actuator suite for establishing and regulating mutually differing brake pressures in the wheel brakes as a function of the slip conditions respectively existing at the associated wheels;
    an electronically controllable second actuator suite for establishing and regulating a uniform brake pressure at the wheel brakes of the braking system;
    a third actuator suite for limiting the brake pressure at the at least one wheel brake associated with the wheel of the rear axle; and
    at least one electronic control device that controls electronic control application to at least one of the first, the second, and the third actuator suite;
    wherein the third actuator suite is connected in series, in terms of flow engineering, with the second actuator suite disposed upstream from the third actuator suite, and with the first actuator suite disposed downstream from the third actuator suite, of the braking system, and wherein in order for the third actuator suite to be connected in series with the second actuator suite, a single brake line supplies a pressure braking medium between the third actuator suite and the second actuator suite.

2. The electronically slip-controllable braking system as recited in claim 1, wherein the third actuator suite is made up of exactly one distributing valve having two valve connectors, which is switchable, by electronic control application to a valve actuation system, out of a zero-current open idle position in which a pressure-medium-conveying connection exists between the two valve connectors, against a force of a valve return device, into a blocking position in which the pressure-medium-conveying connection between the valve connectors is interrupted.

3. The electronically slip-controllable braking system as recited in claim 1, wherein the first actuator suite and the second actuator suite respectively control a first brake circuit and a second brake circuit, separate from the first brake circuit, of the braking system, the at least one wheel brake of the front axle being associated with one of the first brake circuit and the second brake circuit, and the at least one wheel brake of the rear axle being associated with the respective other of the first brake circuit and the second brake circuit of the braking circuit, and wherein the third actuator suite controls only that brake circuit in which the wheel brake of the rear axle is disposed.

4. The electronically slip-controllable braking system as recited in claim 3, wherein in the one of the first brake circuit and the second brake circuit which is associated with the wheel brake of the front axle, the first actuator suite is connected directly to the second actuator suite.

* * * * *